Nov. 28, 1967     S. T. LAMAR     3,355,348
HEAT SEALABLE-ALUMINUM FOIL PAPER LAMINATE
Filed Sept. 2, 1964
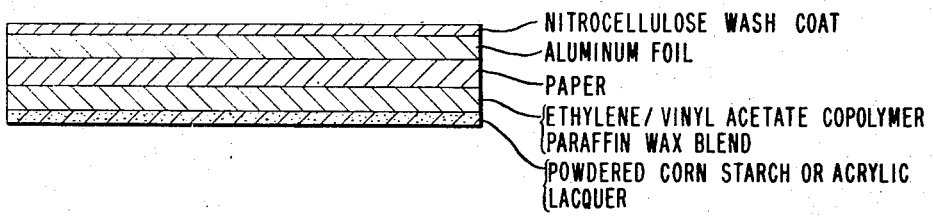
INVENTOR
STANLEY T. LAMAR
BY    John E. Dull
AGENT

United States Patent Office 3,355,348
Patented Nov. 28, 1967

3,355,348
HEAT SEALABLE-ALUMINUM FOIL PAPER LAMINATE
Stanley T. Lamar, Wilmington, Del., assignor to E. I. du Pont de Nemours and Company, Wilmington, Del., a corporation of Delaware
Filed Sept. 2, 1964, Ser. No. 394,023
6 Claims. (Cl. 161—213)

ABSTRACT OF THE DISCLOSURE

Aluminum foil/paper laminated sheet structures useful as packaging materials for bar soap, cigarette cartons, and the like are provided. The structures comprise an aluminum foil/paper laminate having a nitrocellulose wash coat on the aluminum foil, an ethylene/vinyl acetate copolymer-wax blend coated onto the paper, and a powdered corn starch or acrylic lacquer coated onto the blend. The wax in the blend is a paraffin wax having a melting point of at least 150° F.

Background of invention

This invention relates to printable heat-sealable aluminum foil/paper laminate sheet structures suitable for use in the packaging arts.

Aluminum foil/paper laminated sheet structures are commonly used in packaging, for example, to wrap bar soap, cigarette cartons, and the like. The laminated sheet structures used commercially heretofore have a shellac wash coat on the aluminum, a tacky microcrystalline wax coated onto the paper and having a thin tissue paper adhered onto the microcrystalline wax. In a packaging operation, the object being packaged is wrapped with the sheet structure so as to form an overlap, i.e., an edge to be sealed where the tissue is on contact with the aluminum foil shellac wash coat. Application of heat to the overlapping area causes the microcrystalline wax to pass through the tissue forming a bond.

Although these aluminum foil/paper laminate sheet structures used heretofore have attained considerable commercial success, they have several serious deleterious properties which are undesirable to practitioners in the art. For example, the microcrystalline wax tends to exude to the surface of the laminate structure, and being tacky, often causes packing and processing equipment to jam. Furthermore, there is a tendency for blocking when the sheet structures are stored in rolls. Also, the finished packaged goods, such as wrapped bar soap, etc., often stick together because of this blocking problem. In addition, the microcrystalline wax is very fluid when heated. When heat is applied to the structures in the sealing step, usually an excess amount of the wax penetrates the tissue paper which then rubs off onto the packaging equipment, thereby fouling the equipment. Also, ultimate heat sealed bonds are often undesirably low. Moreover, the heat seal activation times are relatively long and the required activation temperatures are relatively high, resulting in undesirably slow machine times for mass packaging requirements.

Recognizing the known excellent heat-sealability properties of various ethylene/vinyl acetate copolymer-petroleum wax blends, practitioners of the art have attempted to replace the tacky microcrystalline wax and tissue paper of the previously used aluminum foil/paper laminate sheet structures with such copolymer-wax blends. The ethylene/vinyl acetate copolymer-petroleum wax blends overcome the above-stated problems inherent in the structures which employ the combination of tacky micro-crystalline wax and tissue paper. However, additional problems arise with these more recently developed sheet structures.

When the aluminum foil/paper laminate sheet structures having ethylene/vinyl acetate copolymer-petroleum wax blends coated onto the paper side of the laminate are stored in rolls under normal commercial storage conditions, there is a transfer of minute quantities of the copolymer-wax blend onto the surface of the aluminum foil. This transfer of minute quantities from the one surface to the other is termed in art as "offset." When offset occurs the minute quantities of the copolymer-wax blends on the aluminum foil surface prevents proper adhesion of common printing inks on the surface, and thus such sheet structures are not printable after they have been stored in rolls, which is the ordinary commercial practice.

Accordingly, it is an object of the present invention to provide improved printable, heat-sealable aluminum foil/paper laminate sheets structures. A further object is to provide improved heat-sealable aluminum foil/paper laminate sheet structures having ethylene/vinyl copolymer-wax blends coated onto the paper side of the laminate, with the sheet structures being printable after storage in rolls.

Summary of the invention

These and other objects are attained by the present invention which provides a printable heat-sealable flexible sheet stucture comprising an aluminum foil/paper laminate having (1) a nitrocellulose wash coat on the said aluminum foil, (2) a blend containing 15–40% by weight of an ethylene/vinyl acetate copolymer having a copolymerized vinyl acetate content of 15–35% by weight and a melt index of 0.1–500, and a paraffin wax having a melting point of at least 150° F. coated onto the said paper, and (3) a member selected from the group consisting of powdered corn starch and an acrylic lacquer coated onto the said blend.

Description of drawing

The drawing represents a cross-section view of the sheet structures of this invention.

Description of invention

The aluminum foil/paper laminates used in this invention may be obtained from commercial sources, or may be prepared by adhering aluminum foil and paper together with a flexible adhesive. Suitable flexible adhesives include casein latex, low molecular weight polyethylene, microcrystalline wax, ethylene/vinyl acetate copolymer-petroleum wax blends, and the like.

It has been standard practice in the art to coat the aluminum surface of the laminates used heretofore with shellac. However when the aluminum surface of the sheet structures of this invention are coated with shellac, there is considerable offset when the sheet structures are stored in rolls, resulting in totally unacceptable printability properties. It has been discovered that coating the aluminum surface with nitrocellulose instead of shellac eliminates the offset problem and the resulting sheet structures are printable after storage under normal commercial conditions. The nitrocellulose coating (commonly termed a "wash coat") may be applied from a solution of nitrocellulose in a suitable solvent such as butyl acetate. After the nitrocellulose solution is applied by doctoring, brushing, spraying or other suitable means, the solvent is evaporated leaving the necessary nitrocellulose wash coat on the aluminum surface of the laminate.

The paper side of the aluminum foil/paper laminate must be coated with an ethylene/vinyl acetate copolymer-paraffin wax blend having specific critical component and proportion limitations.

The ethylene/vinyl acetate copolymers used in this invention must have a copolymerized vinyl acetate content of from 15 to 35% by weight of the copolymer. Copolymer-wax blends prepared from ethylene/vinyl acetate copolymers having a copolymerized vinyl acetate content of greater than about 35% by weight are too soft and tacky, resulting in intolerable blocking. The use of copolymers having a copolymerized vinyl acetate content of less than about 15% results in copolymer-wax blends having undesirably poor sealability, high brittleness, and low crease resistance. Best results are obtained with ethylene/vinyl acetate copolymers having a copolymerized vinyl acetate content of 25 to 30% by weight. It is also critical to this invention that the ethylene/vinyl acetate copolymers have a melt index of 0.1 to 500 grams/10 minutes as determined by the procedure of ASTM method D–1238–57T. Copolymers having a melt index of greater than about 500 are too soft to be of use in this invention. The preferred ethylene/vinyl acetate copolymers of this invention have a melt index of 1 to 20.

The ethylene/vinyl acetate copolymers may be prepared by any convenient process, such as disclosed in U.S. Patent 2,200,429, issued to Perrin et al., and U.S. Patent 2,703,794, issued to Roedel.

Both paraffin and microcrystalline waxes have been blended with ethylene/vinyl acetate copolymers for various purposes. Paraffin wax is a mixture of solid hydrocarbons derived from the overhead wax distillate fraction obtained from the fractional distillation of petroleum. After purification, the paraffin wax contains hydrocarbons that fall within the formula $C_{23}H_{48}$—$C_{35}H_{72}$. It is a substantially colorless, hard, and translucent material usually having a melting point of from 125° to 165° F. Microcrystalline wax is obtained from the nondistillable still residues from the fractional distillation of petroleum. It differs from paraffin wax in having branched hydrocarbons of higher molecular weight. It is considerably more plastic than paraffin wax and usually has a melting point of about 150–200° F.

For use in this invention it is essential to select a paraffin wax having a melting point of at least about 150° F. Copolymer-wax blends containing paraffin waxes having lower melting points are inoperable in this invention because of excessive tackiness, as are blends containing microcrystalline waxes having melting points of about 150° to 165° F. comparable to the paraffin waxes used in this invention. Furthermore, the comparable microcrystalline waxes and lower melting point paraffin waxes cause offset when stored in rolls under normal commercial storage conditions. Consequently, sheet structures coated with blends containing such waxes do not have acceptable printability properties.

The ethylene/vinyl acetate copolymer-paraffin wax blends of this invention must contain 15 to 40% by weight of the copolymer and 60–85% by weight of wax. The minimum operable copolymer concentration is a function of the copolymerized vinyl acetate content and melt index of the copolymer, and also depends on whether the laminate sheet structures are to be heat sealed with the blend surface adhered to the aluminum foil surface or with the blend-to-blend. Where the sheet structures are sealed so that the blend surface is adhere to another blend surface, as in a cereal box liner or the like, all of the ethylene/vinyl acetate copolymers of this invention, described above, may be used at a concentration of 15%. However, if the sheet structures are to be overlapped and sealed with the blend surface adhered to the aluminum foil surface, as in carton packaging or the like, in some instances, it may be necessary to incorporate more than 15% of the copolymer into the blend in order to obtain desirable heat seal bond strengths. Heat seal bond strengths vary directly with the copolymerized vinyl acetate content of the copolymers and vary inversely with the melt index of the copolymers. Therefore, larger amounts of copolymers having relatively low copolymerized vinyl acetate contents or relatively high melt indexes may be required. The operable lower concentration limit of the copolymer in the blend may be easily determined by routine experimentation. Optimum properties are obtained with blends containing 20–30% by weight ethylene/vinyl acetate copolymers and 70–80% paraffin wax. The copolymer-wax blends may be prepared by any of the convenient means familiar to those skilled in the art such as by heating and agitating the components to obtain a homogeneous melt.

The ethylene/vinyl acetate-paraffin wax blends of this invention do not block when the sheet structures are stored in rolls. However, these blends do offset, thus preventing satisfactory printing with ordinary commercial printing inks. It has been discovered that such offset can be prevented by coating the copolymer-wax blend with either powdered corn starch or an acrylic lacquer. Powdered corn starch may be conveniently coated onto the copolymer-wax blend by the familiar electrostatic discharge technique. The term "acrylic lacquer" is used herein in accordance with its commonly accepted meaning in the art to encompass coatings of acrylic or methacrylic polymers, such as polymethyl methacrylate, methyl methacrylate/alkyl acrylate copolymers, methyl methacrylate/alkyl acrylate/carboxylic acid copolymers, and the like. Such acrylic lacquers are commercially available as organic solvent solutions of the acrylic or methacrylate polymers. Examples of a few suitable acrylic lacquers are described in U.S. Patent 2,934,510 issued to Crissey et al. The acrylic lacquer may be conveniently coated onto the copolymer-wax blend by spraying.

The aluminum foil/paper laminate sheet structures are non-blocking, do not exude any materials which tend to jam processing and packaging equipment, do not offset and therefore can be conventionally printed after storage in rolls under normal commercial storage conditions, and provide excellent ultimate heat seal bonds and relatively short heat seal activation times and low activation temperatures thus being suitable for use in rapid mass packaging processes. Therefore, it will be recognized that the present invention represents a marked improvement over the aluminum foil/paper laminate sheet structures used heretofore.

This invention is further illustrated by the following examples.

*Example 1*

This example illustrates the printability properties of the aluminum foil/paper laminate sheet structures of this invention compared to the printability properties of aluminum foil/paper laminate sheet structures used heretofore. In this example, aluminum foil/paper laminate sheets having copolymer-wax blends, as noted in Table I, coated onto the paper of the laminate, and where noted, having powdered corn starch coated onto the blend are placed in contact with wash coated aluminum foil surfaces, under 25 p.s.i. pressure at 73° F., thus simulating commercial roll-storage conditions. Other commercial aluminum foil/paper laminate sheets having the conventional tacky microcrystalline wax-tissue paper layers adhered to the paper side of the laminates are also placed in contact with wash coated aluminum foil surfaces under the same conditions. The sheets are maintained in such contact for 32 days. Thereafter, the wash coated aluminum surfaces are completely printed with a commercial green printing ink and allowed to air dry for several minutes. Cellophane tape (No. 610 High-Tack "Scotch Tape") is then placed on the printed surfaces and pulled off with short jerky motions at a 180° angle with the surfaces. The tapes are then placed on white bond paper so that any pickoff of the green ink onto the tape could be readily seen. In this test, ink is removed from the printed surfaces at any point where there is offset. Therefore, the amount of ink picked off by the tape is a direct indication of the amount of offset, which in turn is a direct measure of the printability properties of the aluminum foil/paper laminate sheets after storage in rolls under normal commercial conditions. In Tests 1–4 of this example, the aluminum surfaces have a nitrocellulose wash coat. In Tests 5–8, the aluminum surfaces have a conventional shellac wash coat. In Tests 1 and 5, the paper side of the sheets are coated with a blend of 25% of an ethylene/vinyl acetate copolymer having a copolymerized vinyl acetate content of about 28% by weight and a melt index of about 15 and 75% of a paraffin wax having a melting point of 153° F. Powdered corn starch is coated onto the copolymer-wax blend. In Tests 2 and 6 the paper sides of the sheets are coated as in Tests 1 and 3, except that the copolymer-wax blends are coated with an acrylic resin lacquer instead of the powdered corn starch. In Tests 3 and 7, the paper sides of the sheets are coated with copolymer-wax blends as in Tests 1 and 4, however, there is no additional coatings on the blends. In Tests 4 and 8 commercial aluminum foil/paper laminates are used having tacky microcrystalline wax and tissue paper layers on the paper side of the laminates. The results of these tests are summarized in Table I, wherein ethylene/vinyl acetate copolymer is abbreviated "E/VA" and tacky micro-crystalline wax-tissue paper layers abbreviated "micro-tissue." The relative degree of offset is indicated as none, trace, light, medium, and heavy. While laminates having an offset of "light" have been used commercially heretofore, "non" or "trace" offset is desired.

is considered commercially acceptable when used on laminates having a nitrocellulose wash coat on the aluminum, and powdered corn starch, or an acrylic lacquer coated onto the copolymer-wax blend. The results of this example are shown in Table II.

TABLE II

| Test No. | Wax Melting Point, ° F. | Gradient Temperature Bar Offset Temperature, ° F. | | |
|---|---|---|---|---|
| | | Initial | 50% | Complete |
| 1 | 125 | <90 | 98 | 100 |
| 2 | 134 | 90 | 100 | 106 |
| 3 | 140 | 90 | 101 | 106 |
| 4 | 141 | 91 | 112 | 113 |
| 5 | 146 | 95 | 114 | 119 |
| 6 | 153 | 112 | 132 | 135 |
| 7 | 154 | 105 | 131 | 133 |

As seen from the results of this example, it is essential to use a paraffin wax having a melting point of at least 150° F. in the ethylene/vinyl acetate copolymer-paraffin wax blends employed in this invention.

This invention has been described in considerable detail. However, those skilled in the art will recognize many variations and modifications of these details which can be made without departing from the spirit and scope of this invention. Accordingly, it should be understood that this

TABLE I

| Test No | 1 | 2 | 3 | 4 | 5 | 6 | 7 | 8 |
|---|---|---|---|---|---|---|---|---|
| Wash Coat on Aluminum Foil | Nitrocellulose. | Nitrocellulose. | Nitrocellulose. | Nitrocellulose. | Shellac. | Shellac. | Shellac. | Shellac. |
| Coating on Paper | E/VA-Wax plus Corn Starch. | E/VA-Wax plus Acrylic Lacquer. | E/VA-Wax. | Micro-Tissue. | E/VA-Wax plus Corn Starch. | E/VA-Wax plus Acrylic Lacquer. | E/VA-Wax. | Micro-Tissue. |
| Degree of Offset After 32 Days | None. | Trace. | Medium. | Trace. | Medium. | Medium. | Heavy. | Light. |

*Example 2*

This example illustrates the necessity of using in the ethylene/vinyl acetate copolymer-wax blend a paraffin wax having a melting point of at least 150° F. The test procedure employed in this example is based upon the known fact that the degree of offset increases with an increase in temperature, and provides a very effective measure of the offset resistance of any copolymer-wax blend. In this example, paper strips measuring 1 x 24 inches are coated with blends of 25% ethylene/vinyl acetate copolymer and 75% of a paraffin wax as noted in Table II. These coated strips are placed in contact with strips of a commercial high-quality label paper ("Kromekote") having the same dimensions, which are placed on a brass plate which is continuously heated at one end by hot oil and continuously cooled at the other end by water to provide a gradient temperature from 75° F. to 160° F. across the plate. To maintain this gradient temperature, a temperature recorder is used to continuously monitor the plate temperatures by thermocouples located at 4 inch intervals across the plate. A strip of sponge rubber is placed on the top of each sample strip, and a one inch square strip of steel is placed on top of the sponge rubber. After 17 hours the sample strips are removed from the plate and allowed to cool. The label papers and the ethylene/vinyl acetate copolymer-wax coated papers are separated. To evaluate the offset resistance of each sample copolymer-wax blend, the label papers are tested for ink receptivity by painting each entire strip with a commercial ink. Since offset interferes with ink receptivity, the areas of the strips affected by offset are readily seen. The temperatures corresponding to initial offset, 50% offset, and complete offset are then readily determined by visual inspection of each sample strip. A minimum initial offset temperature of 100° F.

invention is not intended to be limited except as defined by the following claims.

What is claimed is:

1. A printable heat-sealable flexible sheet structure comprising an aluminum foil/paper laminate having (1) a nitrocellulose wash coat on the said aluminum foil, (2) a blend containing 15–40% by weight of an ethylene/vinyl acetate copolymer having a copolymerized vinyl acetate content of 15–35% by weight and a melt index of 0.1–500, and a paraffin wax having a melting point of at least 150° F. coated onto the said paper, and (3) a member selected from the group consisting of powdered corn starch and an acrylic lacquer coated onto the said blend.

2. A printable heat-sealable flexible sheet structure comprising an aluminum foil/paper laminate having (1) a nitrocellulose wash coat on the said aluminum foil, (2) a blend containing 15–40% by weight of an ethylene/vinyl acetate copolymer having a copolymerized vinyl acetate content of 15–35% by weight and a melt index of 0.1 to 500, and a paraffin wax having a melting point of at least 150° F. coated onto the said paper, and (3) powdered corn starch coated onto the said blend.

3. A printable heat-sealable flexible sheet structure comprising an aluminum foil/paper laminate having (1) a nitrocellulose wash coat on the said aluminum foil, (2) a blend containing 15–40% by weight of an ethylene/vinyl acetate copolymer having a copolymerized vinyl acetate content of 15–35% by weight and a melt index of 0.1 to 500, and a paraffin wax having a melting point of at least 150° F. coated onto the said paper, and (3) an acrylic lacquer coated onto the said blend.

4. A printable heat-sealable flexible sheet structure comprising an aluminum foil/paper laminate having (1) a nitrocellulose wash coat on the said aluminum foil, (2) a blend containing 20–30% by weight of an ethylene/ vinyl acetate copolymer having a copolymerized vinyl acetate content of 25–30% by weight and a melt index of 1–20, and a paraffin wax having a melting point of at least 150° F. coated onto the said paper, and (3) a member selected from the group consisting of powdered corn starch and an acrylic lacquer coated onto the said blend.

5. A printable heat-sealable flexible sheet structure comprising an aluminum foil/paper laminate having (1) a nitrocellulose wash coat on the said aluminum foil, (2) a blend containing 20–30% by weight of an ethylene/vinyl acetate copolymer having a copolymerized vinyl acetate content of 25–30% by weight and a melt index of 1 to 20, and a paraffin wax having a melting point of at least 150° F. coated onto the said paper, and (3) powdered corn starch coated onto the said blend.

6. A printable heat-sealable flexible sheet structure comprising an aluminum foil/paper laminate having (1) a nitrocellulose wash coat on the said aluminum foil, (2) a blend containing 20–30% by weight of an ethylene/vinyl acetate copolymer having a copolymerized vinyl acetate content of 25–30% by weight and a melt index of 1 to 20, and a paraffin wax having a melting point of at least 150° F. coated onto the said paper, and (3) an acrylic lacquer coated onto the said blend.

References Cited

UNITED STATES PATENTS

| | | | |
|---|---|---|---|
| 2,778,760 | 1/1957 | Hurst | 161—213 |
| 2,976,170 | 3/1961 | Eiland | 161—220 |
| 3,025,167 | 3/1962 | Butler | 99—171 |

EARL M. BERGERT, *Primary Examiner.*

MORRIS SUSSMAN, *Examiner.*

R. J. ROCHE, *Assistant Examiner.*